(12) United States Patent
Wipprich

(10) Patent No.: US 9,409,797 B2
(45) Date of Patent: Aug. 9, 2016

(54) DEVICE FOR TREATING A MEDIUM USING UV RADIATION

(71) Applicant: PURION GMBH, Zella-Mehlis (DE)

(72) Inventor: Walter Wipprich, Zella-Mehlis (DE)

(73) Assignee: Purion GmbH, Zella-Mehlis (DE)

( * ) Notice: Subject to any disclaimer, the term of this patent is extended or adjusted under 35 U.S.C. 154(b) by 0 days.

(21) Appl. No.: 14/924,946

(22) Filed: Oct. 28, 2015

(65) Prior Publication Data

US 2016/0137528 A1    May 19, 2016

(30) Foreign Application Priority Data

Nov. 17, 2014  (DE) .................. 20 2014 009 076 U

(51) Int. Cl.
  *C02F 1/32*  (2006.01)
(52) U.S. Cl.
  CPC ......... *C02F 1/325* (2013.01); *C02F 2201/3222* (2013.01); *C02F 2303/04* (2013.01)
(58) Field of Classification Search
  USPC ............ 250/435, 436; 422/22, 24; 210/198.1, 210/418
  See application file for complete search history.

(56) References Cited

U.S. PATENT DOCUMENTS

| 7,270,748 | B1 | 9/2007 | Lieggi | |
| 2006/0167531 | A1* | 7/2006 | Gertner | A61N 5/0603 607/86 |
| 2007/0163934 | A1 | 7/2007 | Kim et al. | |
| 2010/0258507 | A1* | 10/2010 | Maiden | A45F 3/20 210/739 |
| 2013/0146783 | A1 | 6/2013 | Boodaghians et al. | |
| 2013/0236353 | A1 | 9/2013 | Blechschmidt et al. | |
| 2014/0050612 | A1 | 2/2014 | Kneissl et al. | |

FOREIGN PATENT DOCUMENTS

DE  102011112994 A1  3/2013
WO  2012123412 A1  9/2012

* cited by examiner

*Primary Examiner* — Kiet T Nguyen
(74) *Attorney, Agent, or Firm* — Laurence A. Greenberg; Werner H. Stemer; Ralph E. Locher

(57) ABSTRACT

A device for treating a medium using UV radiation includes a treatment chamber to accommodate the medium. An LED UV radiation source provides UV radiation. A chamber-forming structure has a stiffening base structure with at least one orifice formed therein and has a UV-radiation-transmissive film. The base structure defines a placement of the UV-radiation transmissive film. The chamber-forming structure separates the treatment chamber from the LED UV radiation source, and the UV radiation is introduced into the treatment chamber through the chamber-forming structure.

4 Claims, 3 Drawing Sheets

DEVICE FOR TREATING A MEDIUM USING UV RADIATION

CROSS-REFERENCE TO RELATED APPLICATION

This application claims the priority, under 35 U.S.C. §119, of German application DE 20 2014 009 076.9, filed Nov. 17, 2014; the prior application is herewith incorporated by reference in its entirety.

BACKGROUND OF THE INVENTION

Field of the Invention

The invention relates to a device for treating a medium using UV radiation, in particular for treating drinking water at a discharge/outlet point.

Devices are known from the prior art, which enable a treatment of drinking water in the scope of a so-called terminal point disinfection. For this purpose, a UV radiation source is generally arranged in the region of the water outlet, which the drinking water to be treated flows around and which provides irradiation of the drinking water to be treated at the same time. During the flow around the UV radiation source, possible bacteria present in the drinking water are inactivated, by destroying the corresponding DNA bonds by way of the UV radiation.

Known devices usually have as the UV radiation source a UV lamp as a so-called fluorescent lamp having a quartz glass sheath, which additionally contains mercury. The mercury is used in this case for the emission of the UV radiation.

The disadvantage of such devices is, on the one hand, that mercury is harmful to health when it is released and it can also enter the drinking water unnoticed in the event of possible damage to the quartz glass sheath.

On the other hand, the disadvantage of such devices is the use of the quartz glass, since it is comparatively costly to provide, on the one hand, and does not enable sufficiently flexible adaptation to different geometries of the outlet point, on the other hand.

Furthermore, a device for disinfecting water is known from the document US 2013/0 146 783 A1, which provides the arrangement of multiple LEDs, which emit UV radiation, in a water pipe.

Using such a device, the disadvantages of the mercury-filled UV radiation source and of the use of quartz glass may be avoided, however, the UV LEDs are directly subjected to the effect of the water to be treated in this case, whereby damage to the LEDs and therefore failure of the device is to be expected in the long term. In addition, continued geometric adaptability to different designs of a outlet point for drinking water cannot be ensured using the device described here.

SUMMARY OF THE INVENTION

The object of the present invention is therefore, to overcome disadvantages of the prior art and to provide a device for treating a medium using UV radiation, which is may be produced cost-effectively and which additionally enables flexible geometric adaptation to different usage requirements.

With the foregoing and other objects in view there is provided, in accordance with the invention, a device for treating a medium using UV radiation includes a treatment chamber to accommodate the medium. An LED UV radiation source provides UV radiation. A chamber-forming structure has a stiffening base structure with at least one orifice formed therein and has a UV-radiation-transmissive film. The base structure defines a placement of the UV-radiation transmissive film. The chamber-forming structure separates the treatment chamber from the LED UV radiation source, and the UV radiation is introduced into the treatment chamber through the chamber-forming structure.

The object is achieved by a device having the features and refinements result set forth in the following disclosure.

In particular liquid media, for example, water, or gaseous media, for example, air, are to be understood as a medium in the meaning of a device according to the invention for treating a medium using UV radiation, without the invention exclusively being restricted to such media.

A device according to the invention for treating a medium using UV radiation includes a treatment chamber, a chamber-forming structure, and an LED UV radiation source.

In the present case, the treatment chamber represents the chamber in which the medium to be treated is accommodated during the treatment by the device. In this case, on the one hand, the treatment chamber can be delimited by a container or a vessel, into which the medium to be treated is introduced. On the other hand, the treatment chamber can be delimited by the chamber-forming structure of the device itself, so that the medium to be treated is accommodated in the interior of the chamber-forming structure. The medium can flow through the treatment chamber or stand therein.

The chamber-forming structure is formed according to the invention by a stiffening base structure, which is simultaneously flexibly adaptable in shaping thereof, and a UV-radiation-transmissive film, also referred to hereafter in short as base structure and film, respectively.

The base structure has at least one orifice, in particular of a side wall. Within the device, the chamber-forming structure represents a component which comes into direct contact with the medium to be treated during the treatment of the medium.

In this case, the chamber-forming structure can be introduced into the treatment chamber, on the one hand, which is the case in particular in the above-described formation of the treatment chamber in a container or a vessel. On the other hand, as described above, the chamber-forming structure can enclose or encompass the treatment chamber, so that the medium to be treated can be introduced into the interior of the chamber-forming structure and therefore into the treatment chamber.

With an embodiment of the chamber-forming structure which encloses the treatment chamber, a through-flow solution having small dimensions can be provided as a special advantage. Such an embodiment is advantageously usable in particular in the case of so-called terminal point disinfection of drinking water, in which a treatment of the drinking water using UV radiation is to be carried out shortly before issuing, for example, from a water tap.

Inside the chamber-forming structure, the base structure is used according to the invention for defining the spatial arrangement of the film. In other words, the shaping of the chamber-forming structure is primarily performed in the present case by the base structure, which is used in this case as a framework or as a base for the film.

The film is preferably in direct contact with the base structure for this purpose, a fixed connection does not necessarily have to exist between the film and the base structure. The base structure can be formed in this case, for example, as a wire lattice or plastic lattice, which is adaptable in its shape and geometry to the respective desired application and to the shape of the usage location. It is thus possible, for example, to adapt the geometry of the chamber-forming structure to the line formation in the region of a water tap, to thus provide particularly simple integration of the device in a corresponding drinking water outlet point. Furthermore, a deformable formation of the base structure enables an integration of the device in a water hose, for example, wherein the device is advantageously capable for this purpose of following possible deformations of the hose.

In a special variant of the device, the film itself can also act as a stiffening and shaping structure, so that a separate base structure can be omitted in such a case.

Independently of the embodiment of the chamber-forming structure, the film is always constructed to be medium-tight, i.e., the medium to be treated cannot penetrate the film.

Via the LED UV radiation source, the UV radiation required for the treatment of the medium can be provided according to the invention. The LED UV radiation source can be formed for this purpose by a single UV LED or by an arrangement or an array of multiple UV LEDs, wherein the technological advantages of the LED UV radiation source over conventional UV radiation sources are lower power consumption, particularly short turning-on times, and a comparatively long service life.

The device according to the invention is furthermore distinguished in that the chamber-forming structure separates the treatment chamber from the LED UV radiation source. In this case, the arrangement of the LED UV radiation source within the device is always performed on the side of the film facing away from the medium, so that direct contact of the LED UV radiation source with the medium to be treated is prevented. In this manner, as a special advantage of the device according to the invention, sealing off the UV radiation source in relation to the medium to be treated, which is otherwise typical, can be omitted, whereby the provision effort and the provision costs may be reduced in relation to conventional devices.

The separation of the treatment chamber from the UV radiation source by the chamber-forming structure is performed in particular by the film.

Furthermore, the device according to the invention is distinguished in that the UV radiation for treating the medium can be introduced through the chamber-forming structure into the treatment chamber.

For this purpose, the LED UV radiation source is arranged in the present case inside the device so that the UV radiation can reach the treatment chamber through the film and, in the region of the at least one orifice, through the base structure. In the case of an arrangement according to the invention of multiple UV LEDs in an array, multiple orifices are preferably provided in the base structure, so that each UV LED is arranged in the region of an orifice and a particularly large irradiation region can thus be formed.

The arrangement of the LED UV radiation source in the respective region of the device can be performed in the present case, for example, such that the LED UV radiation source is located in direct contact with the base structure and/or the film, or a defined spacing is maintained between the LED UV radiation source and the chamber-forming structure. In this context, for example, it is also possible to form the film as a double-layer film composite and to laminate the LED UV radiation source into the film composite.

Because of its construction, the device according to the invention for treating a medium has the technological advantage in particular that it is adaptable in its shape for greatly varying uses and usage locations. Thus, the device, for example, enables a medium treatment having a negative irradiation geometry, in that the device is introduced into a corresponding container, in which the medium is accommodated, and therefore introduces the UV radiation into the medium in the treatment chamber from the interior of the container. Alternatively, the device according to the invention enables a treatment of the medium in the scope of a positive treatment geometry, in that the treatment chamber is enclosed or encompassed by the chamber-forming structure, and therefore the UV radiation can be applied externally to the medium during the treatment. The last-mentioned variant of the device additionally offers the special advantage that in this manner a through-flow solution can be provided, in which the medium to be treated flows through the chamber-forming structure, which is particularly advantageous in the case of a so-called point of use treatment, i.e., a treatment of the medium in the region of an outlet point.

A further advantage of the device according to the invention is additionally that, due to the use of the LED UV radiation source, on the one hand, UV radiation sources having health-hazardous materials, in particular otherwise typical, mercury-filled fluorescent lamps can be omitted and therefore the risk of undesired introduction of health-hazardous materials into the medium can be avoided. This is advantageous in particular in the case of drinking water or food uses.

On the other hand, the power consumption for the operation of the LED UV radiation source is comparatively low in relation to conventional devices.

At the same time, the sealing off of the LED UV radiation source in relation to the medium to be treated is provided in a particularly simple and cost-effective manner by the UV-radiation-transmissive film, so that the otherwise typical quartz glass sheath can be omitted and the provision costs for the device can thus be kept low.

In a particularly advantageous refinement of the invention, the UV-radiation-transmissive film consists of PTFE material (polytetrafluoroethylene material). It has been found that a film made of PTFE material has a particularly high transmissivity to UV radiation. At the same time, PTFE is very resistant to acids, bases, and further aggressive media. Moreover, PTFE material has an extremely low surface tension, so that adhesion of possible residues from the medium to be treated on the film is effectively prevented. Particular advantages result with respect to drinking water to be treated, since PTFE is considered physiologically harmless.

A further advantage of the PTFE material is its relatively high heat resistance, because of which, in particular in the event of direct contact of the film with the LED UV radiation source or individual components thereof, damage to the film by corresponding heat development can be prevented.

Moreover, the film made of PTFE material, in particular in the case of a direct connection to the base structure, ensures a high level of operational reliability in the event of fractures of the base structure, in that parts which are possibly detached from the base structure by damage are prevented by the film from shifting position or escaping from the chamber-forming structure.

In addition, a preferred variant of the device according to the invention provides that the UV-radiation-transmissive film is connected by shrinking onto the base structure on the outer side thereof.

By way of the shrinking on, a fixed connection between the film and the base structure which can be provided particularly easily is enabled as an advantage, without additional connection techniques, for example, gluing, having to be applied. In this manner, the provision costs for the device according to the invention can be additionally optimized.

In addition, particularly good sealing off of the LED UV radiation source in relation to the medium to be treated is enabled by the shrinking on.

The LED UV radiation source, in a further preferred variant of the invention, is capable of emitting UV radiation of different wavelengths. To generate such an emission of different wavelengths of the UV radiation, the LED UV radiation source preferably has multiple UV LEDs having different wavelengths. In addition, these can be arranged positioned in a spatially different manner inside the device according to the invention depending on the application.

The technological advantage of the selective emission of different wavelengths of the UV radiation is in particular that in this manner the operating mode of the device can be adapted to different desired applications and specific resonant frequencies of the DNA of bacteria to be expected in the respective medium. The inactivation may be induced reliably in particular in the case of UV irradiation in the resonant frequencies thereof.

In addition, an essential advantage of the variant set forth here is that in particular upon a use of multiple, wavelength-selective UV LEDs, the disadvantage of a narrowband nature of UV LEDs is overcome and at the same time the so-called peak emission characteristic of the UV LEDs is utilized.

Other features which are considered as characteristic for the invention are set forth in the appended claims.

Although the invention is illustrated and described herein as embodied in a device for treating a medium using UV radiation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

The device according to the invention for treating a medium using UV radiation will be explained in greater detail in exemplary embodiments on the basis of FIG. 1a shows a device as a through-flow solution having internal film.

DETAILED DESCRIPTION OF THE INVENTION

Figure 1A:
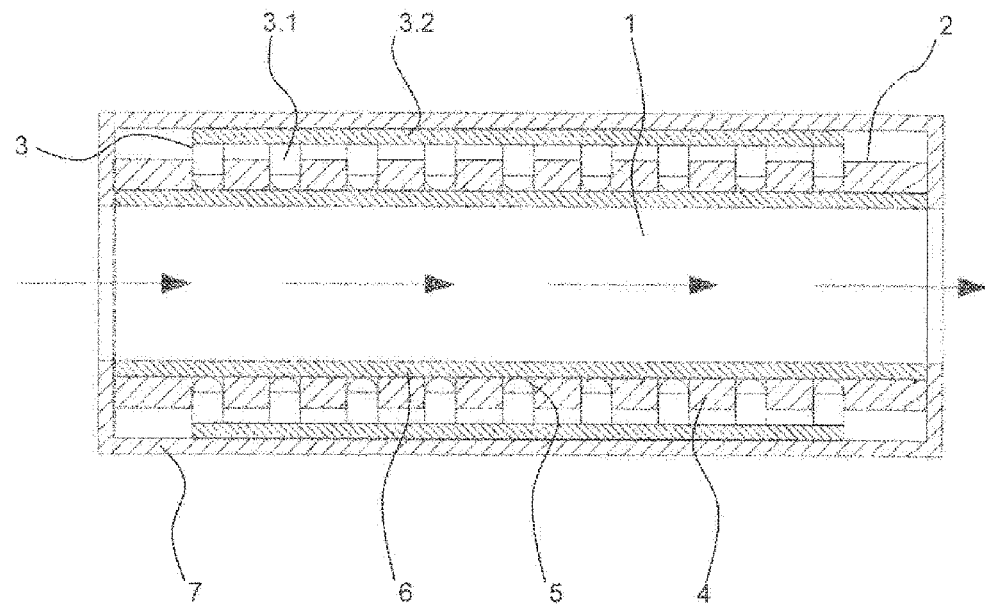
FIG. 1b shows a device as a through-flow solution having shrunk-on film.

The exemplary embodiments relate to systems for disinfecting water and include, according to FIGS. 1a to 3, a chamber-forming structure 2 and an LED UV radiation source 3 for providing the UV radiation required for the treatment.

The chamber-forming structure 2 is formed in the present case by a stabilizing base structure 4 having a plurality of orifices 5, and by a UV-radiation-transmissive film 6.

Both the base structure 4 and also the film 6 are formed as elastic in the present case, wherein the base structure 4 consists in particular of an elastic plastic material and the film 6 consists of a PTFE material, and wherein a definition of the spatial arrangement and the shape of the film 6 is provided by the base structure 4.

In addition, in all exemplary embodiments shown here, the LED UV radiation source 3 includes a plurality of UV LEDs 3.1, in a uniformly spaced-apart linear and additionally opposing arrangement, which are supplied with the electrical current for the operation thereof via distributor units 3.2.

For the sake of better comprehensibility, an illustration of the power terminals required for operation of the device was omitted in FIGS. 1a to 3.

The arrangement of the UV LEDs 3.1 is performed according to the illustrated exemplary embodiments in the orifices 5 of the base structure 4, wherein each UV LED 3.1 is associated with one orifice 5.

As shown in FIGS. 1a to 3, the exemplary embodiment is furthermore distinguished in that a separation of the LED UV radiation source 3 from the medium to be treated is performed by means of the film 6, and in that the required UV radiation can be introduced through the orifices 5 into the medium to be treated.

The treatment of the respective medium is performed in a treatment chamber 1, in which the medium can be accommodated.

Figure 1B:
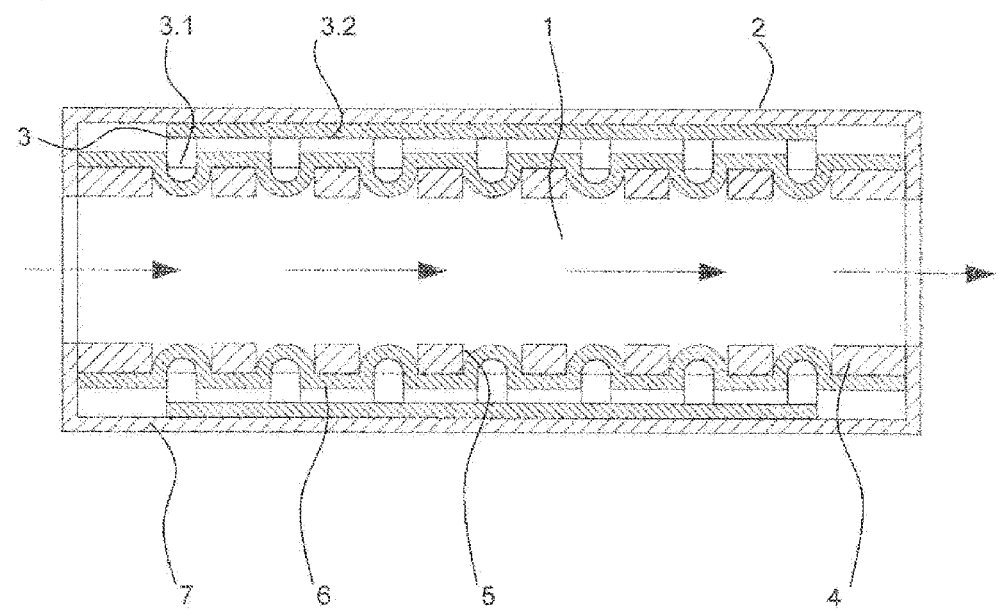
Figure 3:
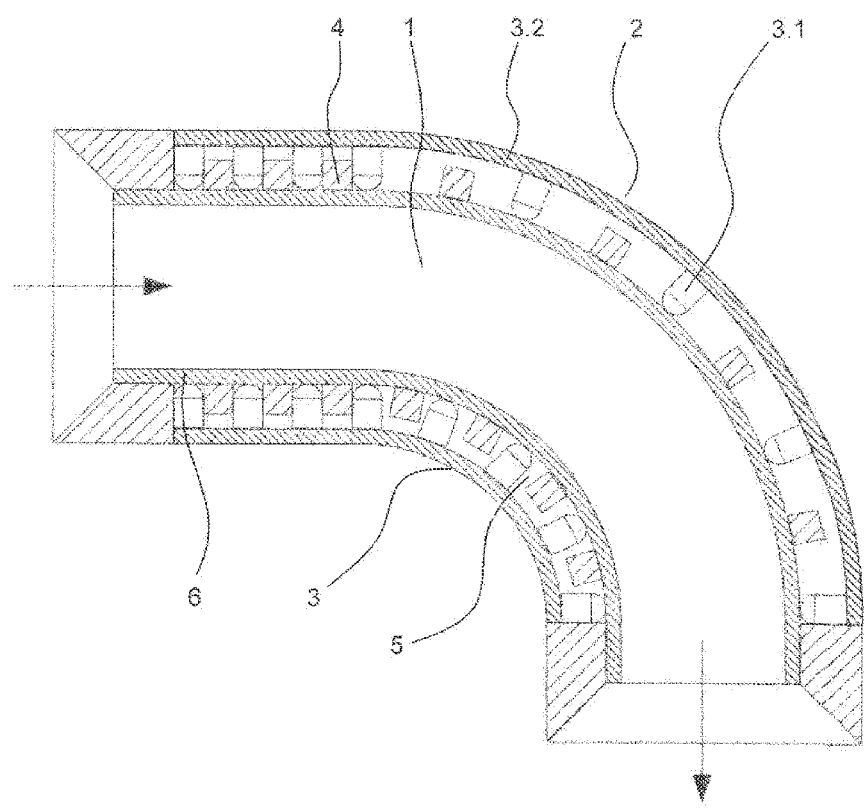
FIG. 3 shows a device as a through-flow solution in the curved state.

FIGS. 1a, 1b and 3 show embodiment variants of the device according to the invention in the present case, in which the treatment chamber 1 is arranged inside the device and in which the medium to be treated flows through the treatment chamber 1 in each case during irradiation using UV radiation. Such embodiment variants are suitable in particular for the treatment of drinking water in a drinking water system, wherein the device is preferably arranged in the region of the drinking water outlet.

Specifically, FIG. 1a shows an exemplary embodiment of the device, in which the film 6 is arranged on the inner side of the chamber-forming structure 2 and is connected, for example, by means of gluing or welding, to the base structure 4. In addition, in the exemplary embodiment shown here, the device includes a housing 7, which encompasses the chamber-forming structure 2 and the LED UV radiation source 3 and therefore provides the sealing off of the chamber-forming structure 2 and the LED UV radiation source 3 to the outside.

In contrast, FIG. 1b shows an exemplary embodiment of the device in which the film 6 is connected to the base structure 4 by shrinking onto the outer side thereof. The shrinking of the film 6 onto the base structure 4 offers the special advantage in this case that, on the one hand, additional connecting means such as adhesive are omitted and at the same time a particularly good sealing off of the LED UV radiation source 3 in relation to the medium to be treated can be provided.

The device also includes a housing 7 in the exemplary embodiment according to FIG. 1b, which encompasses the chamber-forming structure 2 and the LED UV radiation source 3 and therefore seals off these components to the outside.

The housing 7 illustrated in FIGS. 1a and 1b preferably consists of a flexible material, for example, rubber or elastomer.

Figure 2:
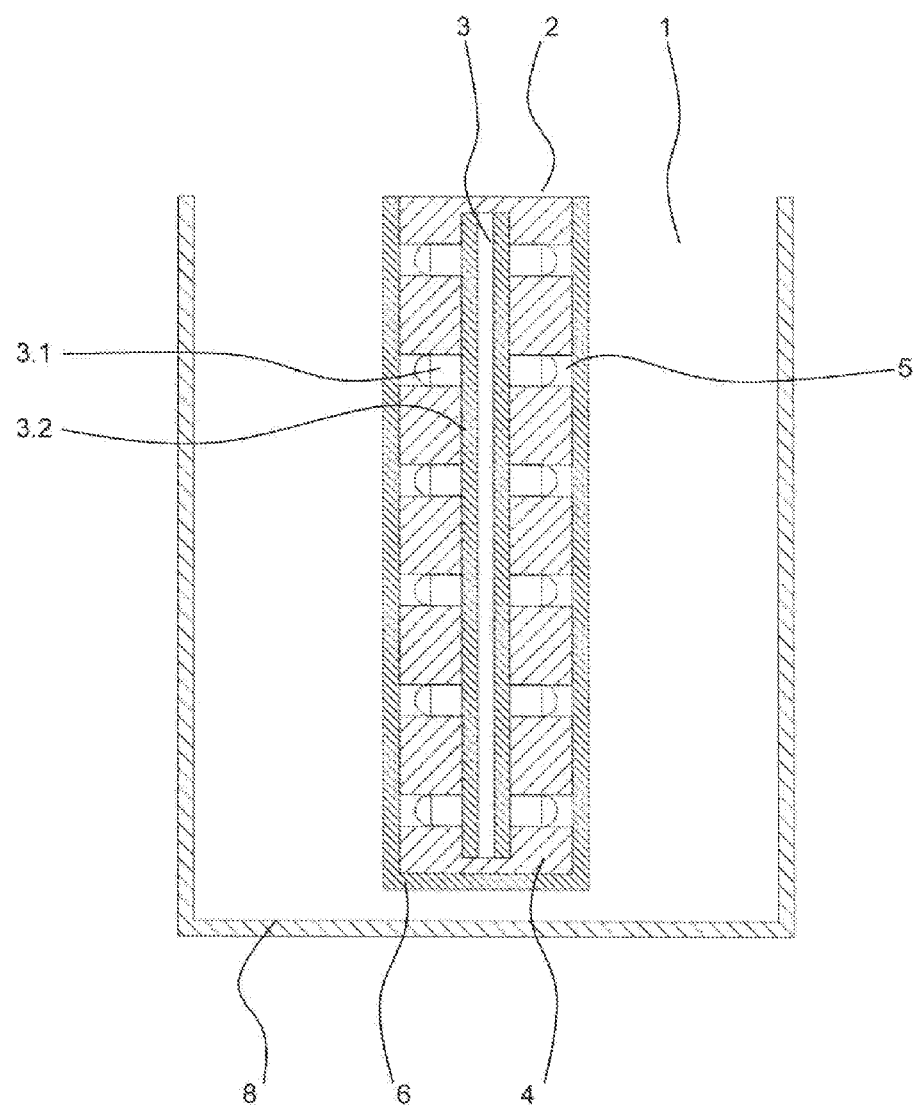
FIG. 2 shows a device as an immersion solution having external film.

FIG. 2 shows an exemplary embodiment of the device in the present case, in which it is designed as an immersion solution for introduction into a container 8. The container 8 is used in this case to accommodate the medium to be treated, wherein the treatment chamber 1 is formed in the exemplary embodiment shown here by the space between the chamber-forming structure 2 and the inner walls of the container 8. The sealing off of the LED UV radiation source 3 in relation to the medium to be treated is also provided in the present case by the film 6, wherein the UV radiation which can be emitted by the LED UV radiation source 3 can be introduced through the orifices 5 and the film 6 into the medium to be treated.

FIG. 3 also shows an exemplary embodiment of the device according to the invention for providing a through-flow solution, wherein the device explicitly does not have an external housing in this case, and wherein the device is shown in a curved state.

Rather, the device is delimited on the outside by the sections of the base structure 4 and the distributor units 3.2. To provide elastic deformability of the device, in the present case the distributor units 3.2 also consist of a flexibly yielding material.

The variant of the device shown in FIG. 3 is suitable in particular for use in a hose (not shown), wherein the device is capable because of the elastic design of the chamber-forming structure 2 and the distributor units 3.2 of absorbing deformations of the hose without damage occurring inside the device.

The invention claimed is:

1. A device for treating a medium using UV radiation, comprising:
   a treatment chamber for accommodating the medium;
   an LED UV radiation source for providing UV radiation; and
   a chamber-forming structure having a stiffening base structure with at least one orifice formed therein and a UV-radiation-transmissive film, said base structure defining a placement of said UV-radiation transmissive film, said chamber-forming structure separating said treatment chamber from said LED UV radiation source, and the UV radiation being introduced into the treatment chamber through the chamber-forming structure.

2. The device according to claim 1, wherein the UV-radiation-transmissive film consists of PTFE material.

3. The device according to claim 1, wherein said UV-radiation-transmissive film is connected by shrinking onto the base structure on an outer side thereof.

4. The device according to claim 1, wherein said LED UV radiation source is configured to emit UV radiation of different wavelengths.

* * * * *